J. P. SELLMER.
AEROPLANE.
APPLICATION FILED NOV. 4, 1920.
1,376,785. Patented May 3, 1921.
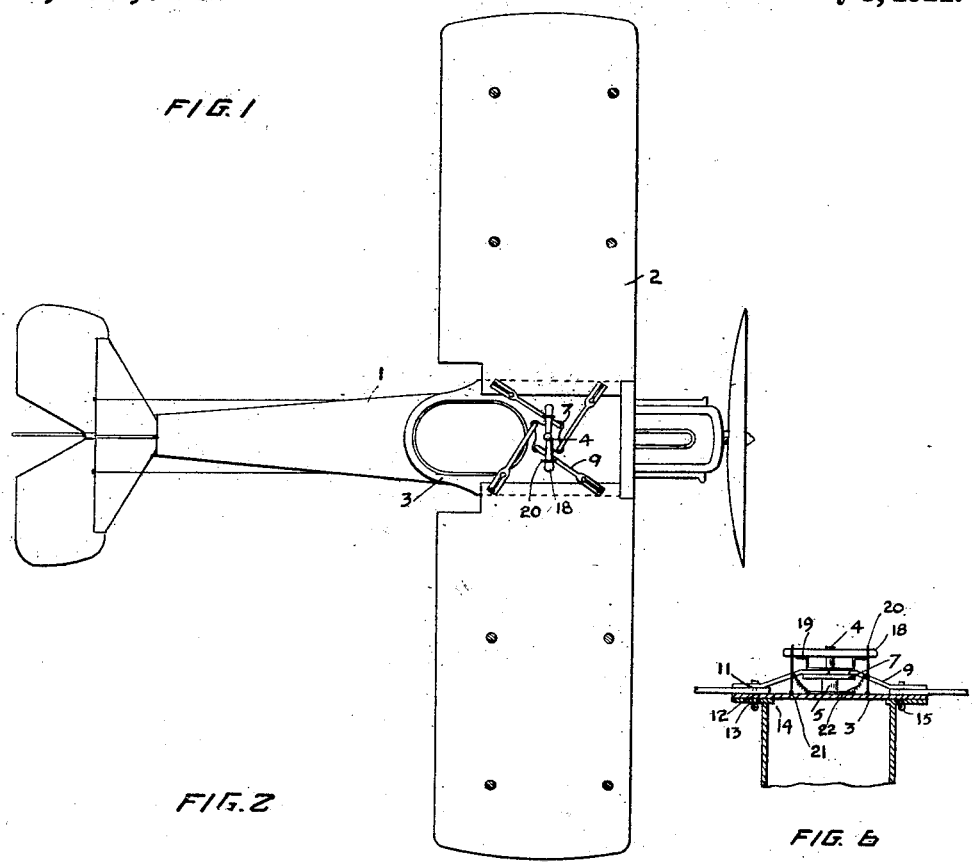
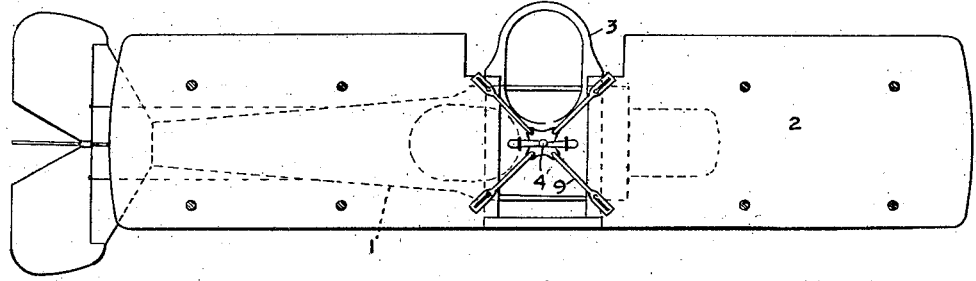
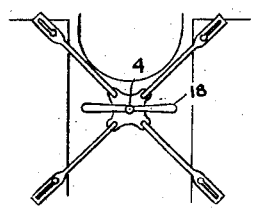
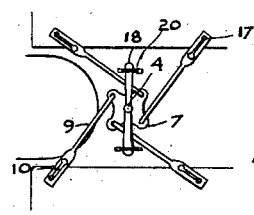
INVENTOR
J. P. SELLMER
BY Wright & Brown
ATTYS.

UNITED STATES PATENT OFFICE.

JACOB P. SELLMER, OF SAN ANSELMO, CALIFORNIA.

AEROPLANE.

1,376,785.      Specification of Letters Patent.      Patented May 3, 1921.

Application filed November 4, 1920. Serial No. 421,742.

*To all whom it may concern:*

Be it known that I, JACOB P. SELLMER, a citizen of the United States, residing at San Anselmo, in the county of Marin and State of California, have invented new and useful Improvements in Aeroplanes, of which the following is a specification.

This invention relates to aeroplanes and more particularly to improvements in wing mounting, the primary object of the invention being to provide an aeroplane in which the wings may be moved so as to lie over and parallel to the body or fuselage whereby the shipping, storing and transporting of an aeroplane will be facilitated because of the comparatively small space taken up when the wings lie in the position above-stated. I am aware of aeroplanes in which the wings are hinged to the side of the fuselage and folded rearwardly, but in this construction, it is difficult to maintain the requisite strength in wing structures.

One of the objects of my invention is to provide simple and effective means for pivotally mounting the wing or wings so that the entire wing structure may be turned to lie over and parallel with the body, there being provided easily operable, safe, and reliable means for locking the means in the position of use.

The invention possesses other advantages and features, some of which, with the foregoing will be set forth at length in the following description wherein I shall outline in full that form of the invention which I have selected for illustration in the drawings accompanying and forming a part of the present specification. In said drawings, I have shown one form of the construction of my invention, but it is to be understood that I do not limit myself to such form since the invention as expressed in the claims may be embodied in a plurality of forms.

Referring to the drawings,—

Figure 1 is a top plan view constructed in accordance with my invention.

Fig. 2 is a top plan view showing the wings in folded or turned position, the same lying parallel to, and above, the body.

Fig. 3 is an enlarged top plan view of the mounting and locking means as it would appear unlocked.

Fig. 4 is a top plan view of said means of Fig. 3, showing the same in locked position.

Fig. 5 is an enlarged fragmentary top plan view of one of the elements of the locking means.

Fig. 6 is an enlarged fragmentary sectional view of said locking and mounting means.

Fig. 7 is a fragmentary sectional view of one of the locking bits and bolts.

In carrying out my invention, I pivot the wing or wings, as the case may be, upon the upper side of the fuselage in such a way that said wing or wings may be turned so as to lie above and parallel to the body as shown in Fig. 2. With the wing thus turned as described, the aeroplane may be easily moved through narrow streets and other narrow or crowded places and may be stored or shipped in small compass. In connection with the mounting means, I provide for locking the wings in the position of use in such a way that all possibility of accidental derangement or turning of the wings is prevented.

Referring particularly to the drawings, 1 designates the body or fuselage of an aeroplane and 2 the wing therefor, said wing or wings being mounted upon the upper side of the fuselage. I may carry out my invention in connection with either monoplanes or biplanes and in this instance the aeroplane shown is of the biplane type.

The lower of the wings 2 is provided with a central frame piece 3 which is supported upon suitable bearing surface therefor on the top and fuselage 1. A pivot member 4 is carried upon the fuselage 1 and extends upwardly through the frame 3, there being provided a suitable mounting 5 on said frame through which said pivot member extends. Any other suitable means may be provided for pivotally connecting the wing or wings as the case may be of the body or fuselage of the machine provided that the fuselage is in the center of the wing or wings and will permit of the turning of the wings through 90° of an arc so that it will lie in super-posed parallel relation to the fuselage.

To provide for locking of the wings in the position for use, suitable locking means is provided and this means operates so as to lock the frame 3 carried by the wings to associated parts of the body or fuselage. In this instance, the means comprises a plate 7 fixed to the pivot member 4 adjacent to the upper end of said member, the plate preferably being of rectilinear outline and pivotally connected in any suitable manner is a locking bar 9 in the outer ends of which there is provided a key hole slot 10. The key hole slot 10 is adapted to register with suitable openings 11 provided in the frames of the wing along the front and rear edges of the wing. Registering with the opening 11 are openings 12 and 13 formed in the frame 3 and adjacent parts 14 of the fuselage or body 1 respectively. Pins 15 are inserted from beneath and upwardly through said registering openings and adapted to extend through the key hole slots in the locking bars 9. The pins 15 adjacent to their upper ends are circumferentially grooved as at 16 whereby the heads 17 are provided. The heads 17 are larger than the narrow parts of the key hole slots and smaller than the larger parts of said slots. When the bars 9 are to be locked they are disposed so that the larger parts of the key hole slots register with the openings 11, 12, 13 whereby the heads 17 of the pins may be inserted through said slots 10. By then manipulating the plate 7 so as to draw the heads 17 to lie over the smaller portions of the key hole slots, as shown in Fig. 4, the wings will be locked in place, the pins 17 being prevented from falling out of place by said heads 17. To facilitate the turning of the plate 7, a handle member 18 is fixed thereto by suitable members 19, said handle being pivotally mounted centrally of its ends upon the member 4. To prevent accidental rotation of the plate 7 so as to hold the wings locked, there are provided U-shaped keepers 20, the free ends of which are pivoted as at 21 to the frame 3. Retractile springs 22 are connected with the keepers in the frame 3 so as to hold the keepers in the position embracing the ends of the handle as shown in Fig. 4. When it is desired to manipulate the plates 7, the keepers 20 are moved out of holding position relative to the handle and the handle portions so as to operate said plate.

I claim:

1. An aeroplane embodying in its construction a fuselage, a wing pivoted intermediate of its ends and side edges to said fuselage and movable into position parallel to said fuselage, and means for locking the wing in position of use having locking engagement with the wing and fuselage at spaced points rearwardly and forwardly and on opposite sides of said pivot.

2. An aeroplane embodying in its construction a fuselage, a wing pivoted intermediate of its ends and side edges to said fuselage and movable into position parallel to said fuselage, said wing and fuselage having openings therein adapted to register when the wing is in position of use and members inserted through said openings to hold the wing in place.

3. An aeroplane embodying in its construction a fuselage, a wing pivoted intermediate of its ends and side edges to said fuselage and movable into position parallel to said fuselage, said wing and fuselage having openings therein adapted to register when the wing is in position of use, members inserted through said openings to hold the wing in place, a member movable on said pivot, arms pivoted to said member and arranged to engage and lock said members in place when in one position and to unlock said members in another position and means for moving said member so as to move the arms into and out of locking position.

4. An aeroplane embodying in its construction a fuselage, a wing pivoted intermediate of its ends and side edges to said fuselage and movable into position parallel to said fuselage, said wing and fuselage having openings therein adapted to register when the wing is in position of use, members inserted through said openings to hold the wing in place, a member movable on said pivot, arms pivoted to said member and arranged to engage and lock said members in place when in one position and to unlock said member in another position, means for moving said member so as to move the arms into and out of locking position and means for locking said member against movement.

JACOB P. SELLMER.